No. 787,296. PATENTED APR. 11, 1905.
C. L. HOCKNEY & W. R. CURTISS.
COUPLING.
APPLICATION FILED NOV. 26, 1904.
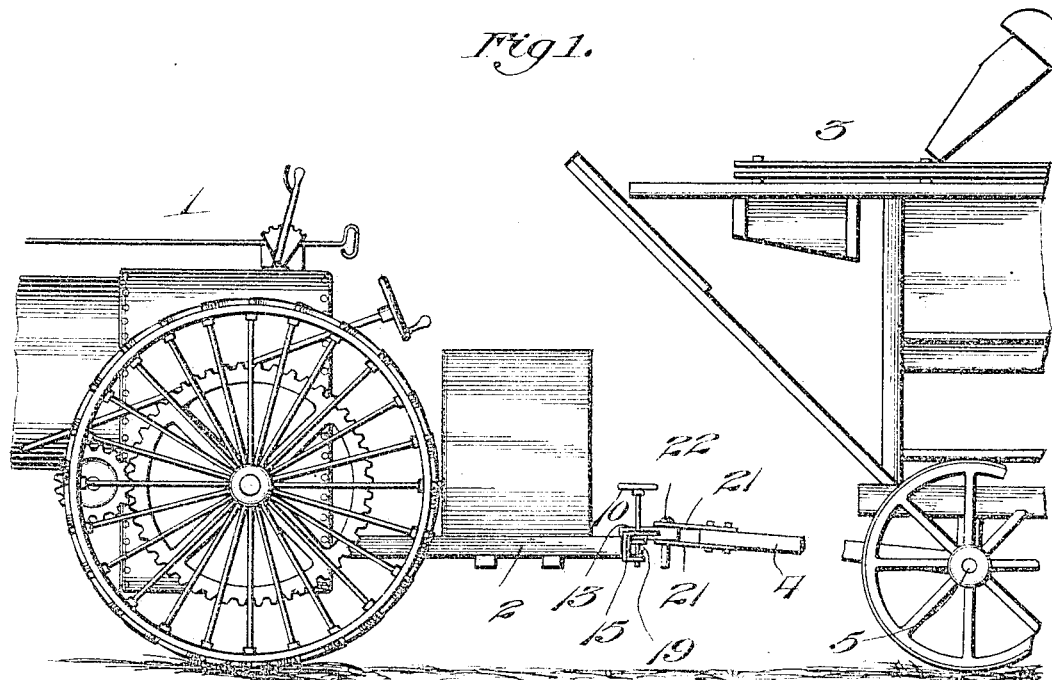
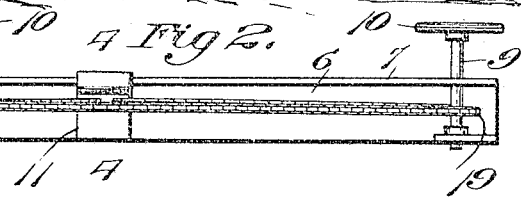
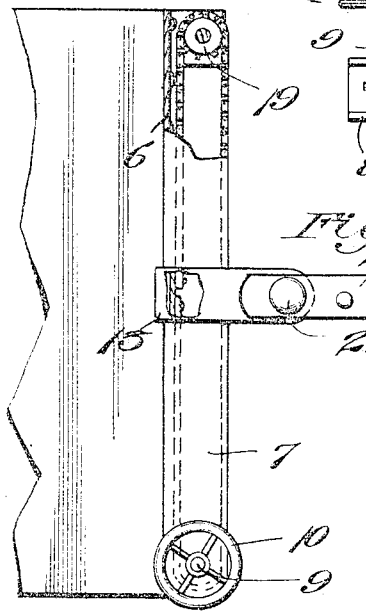
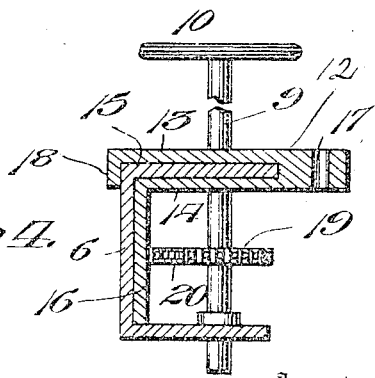
Witnesses
Phil E. Barnes
F. S. Elmore
Inventors
C. L. Hockney
William R. Curtiss.
By Victor J. Evans
Attorney No. 787,296.

Patented April 11, 1905.

UNITED STATES PATENT OFFICE.

CHESTER L. HOCKNEY AND WILLIAM R. CURTISS, OF SILVERLAKE, WISCONSIN.

COUPLING.

SPECIFICATION forming part of Letters Patent No. 787,296, dated April 11, 1905.

Application filed November 26, 1904. Serial No. 234,425.

*To all whom it may concern:*

Be it known that we, CHESTER L. HOCKNEY and WILLIAM R. CURTISS, citizens of the United States, residing at Silverlake, in the county of Kenosha and State of Wisconsin, have invented new and useful Improvements in Couplings, of which the following is a specification.

This invention relates to couplings designed especially for use upon traction-engines for connecting a harvester or other agricultural machine therewith, and has for its objects to produce a simple inexpensive device of this character, wherein the vehicle may be readily and securely coupled to the engine and one in which the vehicle may be readily guided during its travel over the ground.

A further object of the invention is to provide a coupling of this type embodying a steering mechanism under thorough control of and adapted for convenient manipulation by the engineer or other attendant.

To these ends the invention comprises the novel features of construction and combination of parts more fully hereinafter described.

In the accompanying drawings, Figure 1 is a side elevation of portions of a traction-engine and thresher, showing our improved device applied for coupling the machine one to the other. Fig. 2 is a rear elevation of the coupler detached from the engine. Fig. 3 is a detail plan view, partly in section, of the device. Fig. 4 is a transverse sectional elevation, the section being taken on the line 4 4 of Fig. 2 and on an enlarged scale.

Referring to the drawings, 1 designates a traction-engine of the usual construction, provided with a rear platform 2, and 3 a threshing-machine having a tongue or pole 4, connected with the front axle 5 of the thresher and adapted by transverse movement to guide the machine in its travel over the ground, as usual.

Bolted or otherwise attached to the rear edge of the platform 2 is an angle-bar 6 of inverted-L form in cross-section, having an upper flange 7 and provided at its lower edge adjacent its ends with supplemental flanges or ears 8, there being arranged adjacent each end of the bar or member 6 a vertical actuating member or post 9, journaled for rotation in bearings formed in the flanges 7 and 8 and equipped at its upper end with a hand-wheel 10.

Arranged for sliding movement upon and longitudinally of the angle-bar 6 is a primary coupling member 11, cast or otherwise formed from a single piece of metal and comprising a body horizontal portion 12, provided with upper and lower plates 13 14, spaced to produce a seat or recess 15 for the reception of the flange 7, and a downturned vertical portion or flange 16, adapted to bear upon the outer vertical face of the bar 6, this flange 16 being carried by the plate 14, while the horizontal portion 12, which is perforated, as at 17, adjacent its rear end, has formed upon the inner terminal of its upper plate 15 a downturned engaging portion or flange 18, adapted to bear upon the forward vertical face of the bar 6 to maintain the member 11 in engagement with the latter.

Fixed upon and for rotation with the actuating members or posts 9 are sprocket-wheels 19, carrying a sprocket-chain 20, the meeting ends of the forward flight of which are riveted or otherwise rigidly attached to the flange 16 of the coupling member 11, whereby travel of the chain upon the sprocket-wheels, owing to rotation of either of the members 9, will effect a movement of the coupling member 11 upon and longitudinally of the bar 6, as will be readily understood.

Fixedly attached to the outer end of the pole 4 is a pair of secondary coupling members or plates 21, spaced to receive between them the rear end of the horizontal portion 12 of the member 11 and having suitable perforations adapted to aline with the perforation 17 for the reception of a coupling-pin 22.

In practice, supposing the thresher and traction-engine to be coupled, as illustrated in Fig. 1, rotation of either of the actuating members 9 in the direction indicated by the arrow in Fig. 3 will cause a movement of the tongue 4 to the left, thus guiding the thresher in a corresponding direction, while a reverse rotation of either of the members 9 serves to move the tongue to the right for turning the thresher in that direction.

From the foregoing it is apparent that we produce a device of simple construction which may be readily attached to a traction-engine and manipulated for guiding a vehicle drawn by the engine in its travel over the ground and one wherein the steering mechanism will be convenient to and under thorough control of the attendant. In attaining these ends it is to be understood that minor changes in the details herein set forth may be resorted to without departing from the spirit of the invention.

Having thus fully described the invention, what is claimed as new is—

1. In a device of the class described, a guide member adapted for attachment to a vehicle, a coupling member arranged for travel longitudinally of the guide member, a rotary actuating member carrying a pulley, a belt arranged upon and for movement by the pulley, said belt being connected with and designed for moving the coupler, and means for connecting the coupler with a second vehicle.

2. In a device of the class described, a guide-bar adapted for attachment to a vehicle, a coupling member arranged to travel on the bar, rotary shafts arranged adjacent the ends of the bar, pulleys carried by the shafts, a belt arranged for travel on the pulleys and connected with the coupler, and means for connecting the latter with a second vehicle.

In testimony whereof we affix our signatures in presence of two witnesses.

CHESTER L. HOCKNEY.
WILLIAM R. CURTISS.

Witnesses:
JAMES H. READING,
REUBEN H. LEITING.